Patented Nov. 17, 1936

2,061,368

UNITED STATES PATENT OFFICE 2,061,368

PROCESS FOR MAKING YELLOW PIGMENTS

James J. O'Brien, Baltimore, Md., assignor to The Glidden Company, Cleveland, Ohio, a corporation of Ohio No Drawing. Application August 14, 1934, Serial No. 739,814

4 Claims. (Cl. 134—58)

This invention relates to cadmium sulfide pigments, and especially cadmium lithopones, and has particular reference to the optimum conditions for manufacturing these pigments, and to a method for controlling their color, by the admixture of co-precipitated zinc sulfide.

The cadmium lithopones are relatively new pigments, and have received but little attention from most investigators. They may be prepared in a manner analogous to the ordinary zinc lithopones, by reacting cadmium sulfate and barium sulfide, according to the equation:

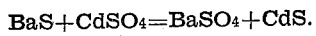

$$BaS + CdSO_4 = BaSO_4 + CdS.$$

The precipitate is golden yellow, due to the presence of the CdS. It is filtered, washed, calcined, and ground to produce a composite pigment; this pigment is superior in hiding power, tinting power and brilliance, to a mere mixture of the same quantities of $BaSO_4$ and CdS.

The cadmium lithopones must compete on the market with the chrome yellow pigments, which are more or less basic lead chromate. The chrome yellows may be precipitated in various colors from a bright primrose yellow to a fairly red orange, depending on conditions; and a variety of colors are sold. To meet this competition, it became necessary to develop a line of colors covering approximately the same range.

Cadmium sulfide is normally a golden yellow color; and attempts to change the shade of the pure product by changing the conditions of precipitation have met with little success.

The pH of the solution may be varied somewhat without materially affecting the color; and I have discovered, in these experiments, that the pH must be kept within relatively narrow limits if economy of operation and good pigment properties are to be obtained. If the pH is kept below 7.0, loss of cadmium results, as soluble material; if the pH is above 8.5, opacity is reduced, and poor covering pigment is obtained. I prefer to operate between pH 7.2 and 8.2, to retain a factor of safety in plant operations.

The color of the precipitate may be varied slightly by altering concentrations and temperatures during precipitation; but the colors obtainable vary but slightly in shade, and the necessary temperatures and concentrations are not such as to give optimum, or even satisfactory, results in the plant from the point of view of handling, filtration, etc.

I have discovered that the colors can be made in a wide range, by adding to the solution materials to be co-precipitated with the cadmium lithopone. For the orange and redder shades, selenium in small amounts is used, as disclosed in the O'Brien Patent #1,894,931, January 17, 1933. For the lighter yellow shades, I have discovered that predetermined quantities of zinc may be precipitated with the cadmium, to give definite colors depending on the quantity of zinc employed. The color obtained is not a mere dilution of the original golden yellow cadmium sulfide with white zinc sulfide, as is the case where the colors are merely mixed; the colors tend over to the green end of the yellow spectrum, and away from the orange, as in the case of the various chrome yellows. The tinting strength is also higher than that of a mixture of quantities equivalent to those in the precipitated pigment.

I am aware that the Marston Patent #1,399,506, December 6, 1921, shows a co-precipitated pigment containing zinc and cadmium; but this pigment is made from ore residues of uncertain composition, the Zn—Cd ratio is neither fixed nor purposely varied and arsenic is present in uncertain quantities, the sulfide of this material tending to throw the color over to an orange cast.

As an example of my invention, I prepared 266 gallons of a solution of 1475 pounds of cadmium sulfate, and precipitated it with 710 gallons of a 17° Baumé barium sulfide solution (containing 200 grams BaS per liter), keeping the pH at about 8.2. The pigment was settled, filtered, washed and calcined in a muffle; the calcined product was quenched, wet ground, filtered, dried and dry ground, to give a golden yellow pigment of good covering and good tinting power.

In a second run, I added to the cadmium sulfate solution 50 gallons of a 30% zinc sulfate solution, and added sufficient extra barium sulfide solution (150 gallons) to precipitate the zinc sulfate. The run otherwise was exactly like the first. The pigment was a primrose yellow of good covering, definitely greener in hue than the golden yellow of the first run, and of only slightly weaker tinting power when reduced with white.

A ratio of 27 cadmium—5 zinc represents the highest amount of zinc which can be added without making an appreciable difference in tinting power; the color at this point is a very pleasing primrose yellow, which corresponds fairly well in shade with the lightest and greenest chrome yellow. Other hues can be prepared by varying the zinc content between 0 and 5; the colors change directly as the zinc content is varied. More zinc can, of course, be added; but such addition serves no purpose, and may be considered adulteration of the product, since the tinting strength is reduced.

A comparison of the co-precipitated product ground in oil with a mixture of the same proportions of cadmium and zinc lithopones similarly ground, shows the co-precipitated product to be brighter, richer and greener, while the mixture is definitely redder and chalkier. This indicates that the co-precipitated product forms a mixed crystal of cadmium and zinc sulfide rather than a mere mechanical mixture.

Concentrations, temperatures, etc., may, of course, be varied somewhat from those shown in the example, in a manner well known to the art.

My improved process makes possible the repeated manufacture of a range of cadmium lithopone colors, which has heretofore not been possible.

I claim:

1. The method of making a pigment which comprises precipitating cadmium sulfate solution with barium sulfide solution, at a pH between 7 and 8.5.

2. The method of making a pigment which comprises precipitating a solution containing cadmium and zinc sulfates with barium sulfide solution, at a pH between 7 and 8.5.

3. The method of making a yellow pigment of predetermined color, which comprises co-precipitating solutions of substantially pure cadmium sulfate and zinc sulfate, with barium sulfide solution, maintaining the pH of the pulp between 7 and 8.5, the ratio of cadmium to zinc being adjusted to predetermine the color.

4. The method of making a yellow pigment of predetermined color, which comprises precipitating a solution of cadmium sulfate and zinc sulfate with barium sulfide solution, maintaining the pH of the pulp between 7.2 and 8.2, the ratio of cadmium to zinc being adjusted to predetermine the color.

JAMES J. O'BRIEN.